(12) United States Patent
Koo et al.

(10) Patent No.: US 10,817,179 B2
(45) Date of Patent: Oct. 27, 2020

(54) ELECTRONIC DEVICE AND PAGE MERGING METHOD THEREFOR

(71) Applicant: Samsung Electronics Co., Ltd., Suwon-si, Gyeonggi-do (KR)

(72) Inventors: Jinkyu Koo, Yongin-si (KR); Hyunsik Kim, Suwon-si (KR); Chungsuk Han, Seongnam-si (KR); Sunho Moon, Suwon-si (KR); Sangbok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 15/573,734

(22) PCT Filed: May 3, 2016

(86) PCT No.: PCT/KR2016/004670
§ 371 (c)(1),
(2) Date: Nov. 13, 2017

(87) PCT Pub. No.: WO2016/182255
PCT Pub. Date: Nov. 17, 2016

(65) Prior Publication Data
US 2018/0150237 A1 May 31, 2018

(30) Foreign Application Priority Data
May 11, 2015 (KR) .......................... 10-2015-0065112

(51) Int. Cl.
G06F 11/14 (2006.01)
G06F 12/02 (2006.01)
(Continued)

(52) U.S. Cl.
CPC ............ *G06F 3/0608* (2013.01); *G06F 3/065* (2013.01); *G06F 3/068* (2013.01); *G06F 3/0632* (2013.01);
(Continued)

(58) Field of Classification Search
CPC ............... G06F 3/00; G06F 3/06–0689; G06F 5/00–16; G06F 9/00–548;
(Continued)

(56) References Cited

U.S. PATENT DOCUMENTS 5,406,278 A * 4/1995 Graybill .................. G06T 9/005
341/106
5,640,496 A * 6/1997 Hardy ..................... G06T 15/10
345/421
(Continued)

FOREIGN PATENT DOCUMENTS

WO 2013/024952 A1 2/2013
WO 2015/057037 A1 4/2015

OTHER PUBLICATIONS

Callable Dialog Manager NB891196; IBM Technical Disclosure Bulletin, vol. 32, iss. 6B, pp. 96-99; Nov. 1989 (Year: 1989).*
(Continued)

*Primary Examiner* — Daniel C. Chappell
(74) *Attorney, Agent, or Firm* — Jefferson IP Law, LLP

(57) ABSTRACT

Provided are an electronic device and a page merging method therefor. The electronic device may include: a memory manager that initializes pages and determines a page as a target to be merged if the page is initialized to a preset specific value; and a memory for merging multiple pages determined as a target to be merged and storing the merged page. The electronic device can determine whether to merge pages with a small amount of computation and merge the pages according to the determination result.
(Continued)

Hence, the electronic device can manage the memory in an efficient manner.

15 Claims, 7 Drawing Sheets

(51) Int. Cl.
  *G06F 12/109* (2016.01)
  *G06F 12/1009* (2016.01)
  *G06F 3/06* (2006.01)

(52) U.S. Cl.
  CPC ............ *G06F 3/0641* (2013.01); *G06F 11/14* (2013.01); *G06F 12/02* (2013.01); *G06F 12/0238* (2013.01); *G06F 12/0246* (2013.01); *G06F 12/1009* (2013.01); *G06F 12/109* (2013.01); *G06F 2212/1024* (2013.01); *G06F 2212/652* (2013.01); *G06F 2212/656* (2013.01); *G06F 2212/657* (2013.01)

(58) Field of Classification Search
  CPC ..... G06F 11/00–28; G06F 11/30–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 15/00–06; G11C 16/00–3495; G11C 17/00–18; G11C 2216/00–30
  See application file for complete search history.

(56) References Cited

U.S. PATENT DOCUMENTS

| | | | | |
|---|---|---|---|---|
| 6,789,156 | B1* | 9/2004 | Waldspurger | G06F 12/1018 711/6 |
| 6,879,266 | B1* | 4/2005 | Dye | G06F 12/08 341/51 |
| 7,287,117 | B2* | 10/2007 | Chung | G06F 12/0246 711/103 |
| 8,930,659 | B2* | 1/2015 | Takahashi | G06F 12/1027 711/165 |
| 9,304,905 | B2* | 4/2016 | Kwon | G06F 12/0246 |
| 9,703,499 | B2* | 7/2017 | Nakano | G06F 3/065 |
| 2003/0110263 | A1* | 6/2003 | Shillo | G06F 3/0601 709/226 |
| 2007/0033325 | A1* | 2/2007 | Sinclair | G06F 3/0605 711/103 |
| 2009/0049271 | A1* | 2/2009 | Schneider | G06F 9/5016 711/206 |
| 2009/0164702 | A1 | 6/2009 | Kern | |
| 2012/0059978 | A1* | 3/2012 | Rosenband | G06F 3/0613 711/103 |
| 2012/0246436 | A1* | 9/2012 | Wang | G06F 9/5016 711/170 |
| 2013/0159596 | A1* | 6/2013 | Van De Ven | G06F 12/109 711/6 |
| 2013/0325821 | A1* | 12/2013 | Amit | G06F 11/1453 707/692 |
| 2014/0164687 | A1 | 6/2014 | Kwon et al. | |
| 2015/0227399 | A1* | 8/2015 | Chin | G06F 12/00 718/107 |
| 2016/0255369 | A1* | 9/2016 | Nam | H04N 19/52 375/240.16 |

OTHER PUBLICATIONS

Malloc(3)—Linux man page; die.net; Sep. 1, 2010; retrieved from https://web.archive.org/web/20100901171130/https://linux.die.net/man/3/malloc on Mar. 4, 2020 (Year: 2010).*

* cited by examiner

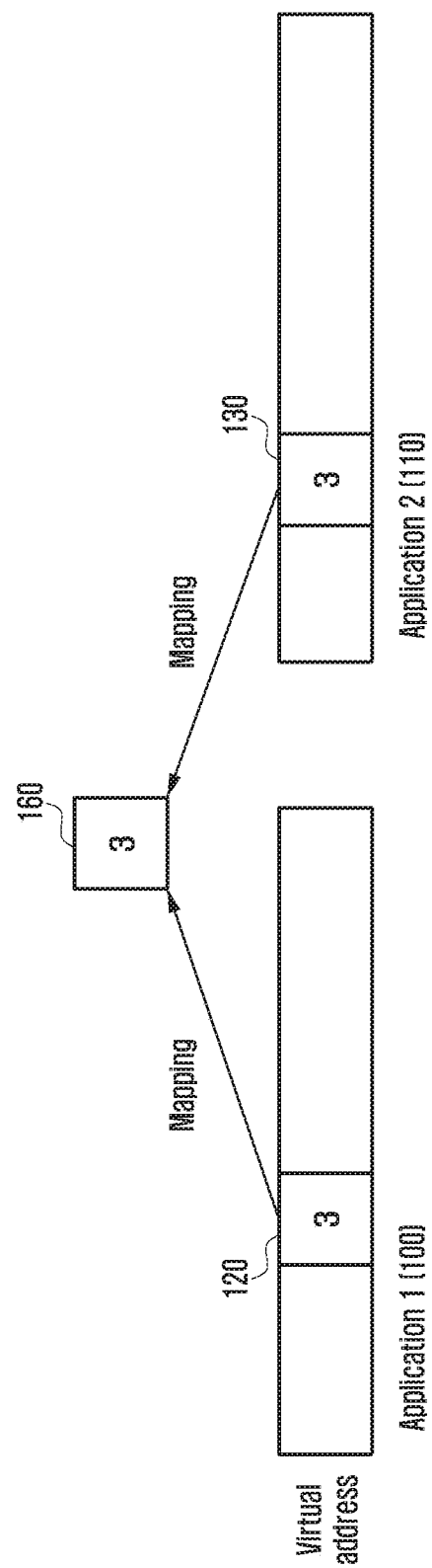

ELECTRONIC DEVICE AND PAGE MERGING METHOD THEREFOR

TECHNICAL FIELD

The present invention relates to an electronic device and page merging method therefor. More particularly, the present invention proposes an electronic device and page merging method therefor for efficient memory management.

BACKGROUND ART

To efficiently manage the memory, the operating system (OS) may use a memory deduplication technique to increase available memory. For example, the memory deduplication technique such as kernel same-page merging (KSM) may scan pages across the entire memory area to remove (i.e. merge) duplicate pages.

However, the existing memory deduplication technique such as KSM determines whether to merge pages for all the pages of the memory area. The amount of computation for determining whether to merge pages may become excessive and consume a large amount of resources and battery power. Hence, it is difficult to efficiently use a memory deduplication technique in an electronic device such as a mobile terminal.

As such, to enable even an electronic device such as a mobile terminal or a TV to efficiently manage the memory by merging pages, there is a need to consider a method for reducing the amount of computation needed to determine whether to merge pages.

DISCLOSURE OF INVENTION

Technical Problem

Accordingly, an aspect of the present invention is to provide an electronic device and page merging method therefor that can easily determine whether to merge pages to thereby efficiently manage the memory.

Solution to Problem

In accordance with an aspect of the present invention, there is provided an electronic device. The electronic device may include: a memory manager that initializes pages and determines a page as a target to be merged if the page is initialized to a preset specific value; and a memory for merging multiple pages determined as a target to be merged and storing the merged page.

The memory manager may determine whether the size of a page initialized to the specific value is greater than or equal to a preset size and, if the size of the page is greater than or equal to the preset size, merge the page and store the merged page in the memory.

When a preset number of pages are determined as a target to be merged, the memory manager may determine whether the initialization value of the preset number of pages is maintained at the specific value, and merge multiple pieces of data and store the merged data according to the determination result.

The memory manager may initialize pages, classify the initialized pages, and determine pages having the same initialization value as a target to be merged.

The memory manager may merge multiple pieces of data determined as a target to be merged when the utilization of the central processing unit of the electronic device is less than or equal to a threshold, when the battery level of the electronic device is greater than or equal to a threshold, or when the amount of idle resources of the electronic device is greater than or equal to a threshold.

The memory may include: a delay memory for storing a page determined as a target to be merged; a candidate list memory for storing a page whose initialization value is maintained at the specific value among the pages stored in the delay memory; and a merge memory for merging pages stored in the candidate list memory and storing the merged page.

When the number of pages stored in the delay memory is greater than or equal to a preset value, the memory manager may select a preset number of pages from among the pages stored in the delay memory in order of storage from oldest, determine whether the initialization value of each of the selected pages is maintained at the specific value, move the pages whose initialization value is maintained at the specific value to the candidate list memory, and, if the number of pages stored in the delay memory is less than the preset value, move pages stored in the candidate list memory to the merge memory.

In accordance with another aspect of the present invention, there is provided a method of merging pages for an electronic device. The method may include: initializing pages; determining a page as a target to be merged if the page is initialized to a preset specific value through the initialization; and merging multiple pages determined as a target to be merged.

Determining a page as a target to be merged may include: determining whether the size of a page initialized to the specific value is greater than or equal to a preset size; and determining, if the size of the page is greater than or equal to the preset size, the page as a target to be merged.

Merging multiple pages may include: determining, when a preset number of pages are determined as a target to be merged, whether the initialization value of the preset number of pages is maintained at the specific value; and merging multiple pieces of data according to the determination result.

Determining a page as a target to be merged may include initializing pages, classifying the initialized pages, and determining pages having the same initialization value as a target to be merged.

Merging multiple pages may include merging the multiple pages determined as a target to be merged when the utilization of the central processing unit of the electronic device is less than or equal to a threshold, when the battery level of the electronic device is greater than or equal to a threshold, or when the amount of idle resources of the electronic device is greater than or equal to a threshold.

Merging multiple pages may include: storing a page determined as a target to be merged in a delay memory; storing a page whose initialization value is maintained at the specific value, among the pages stored in the delay memory, in a candidate list memory; and merging pages stored in the candidate list memory and storing the merged result in a merge memory.

Merging multiple pages may include selecting, when the number of pages stored in the delay memory is greater than or equal to a preset value, a preset number of pages from among the pages stored in the delay memory in order of storage from oldest, determining whether the initialization value of each of the selected pages is maintained at the specific value, moving the pages whose initialization value is maintained at the specific value to the candidate list memory, and moving, if the number of pages stored in the delay memory is less than the preset value, pages stored in the candidate list memory to the merge memory.

Advantageous Effects of Invention

In a feature of the present invention, the electronic device can determine whether to merge specific pages through a small amount of computation and efficiently manage the memory by merging the pages according to the determination result.

BRIEF DESCRIPTION OF DRAWINGS

FIG. 1B illustrates a page merging scheme of an electronic device according to an embodiment of the present invention.

MODE FOR THE INVENTION

Hereinafter, various embodiments of the present invention are described with reference to the accompanying drawings. However, it should be appreciated that the present invention is not limited to a specific embodiment and all modifications, equivalents and/or alternatives thereof also belong to the scope of the present invention. Descriptions of well-known functions and structures incorporated herein may be omitted to avoid obscuring the subject matter of the present invention.

In the description, the terms "first" and "second" may modify various elements regardless of importance and/or order and are used only to distinguish one element from another element without limitation.

Some terms used herein may be provided merely to describe a specific embodiment without limiting the scope of another embodiment. In the description, the singular forms "a", "an" and "the" are intended to include the plural forms as well, unless the context clearly indicates otherwise. It will be understood that the terms "comprising", "including", "having" and variants thereof specify the presence of stated features, numbers, steps, operations, elements, components, and/or groups thereof, but do not preclude the presence or addition of one or more other features, numbers, steps, operations, elements, components, and/or groups thereof.

In the description, the word "module" or "unit" refers to a software component, a hardware component, or a combination thereof, which is capable of carrying out at least one function or operation. A plurality of modules or units may be integrated into at least one module and implemented using at least one processor except for those modules or units that need to be implemented in specific hardware.

Figure 1A:
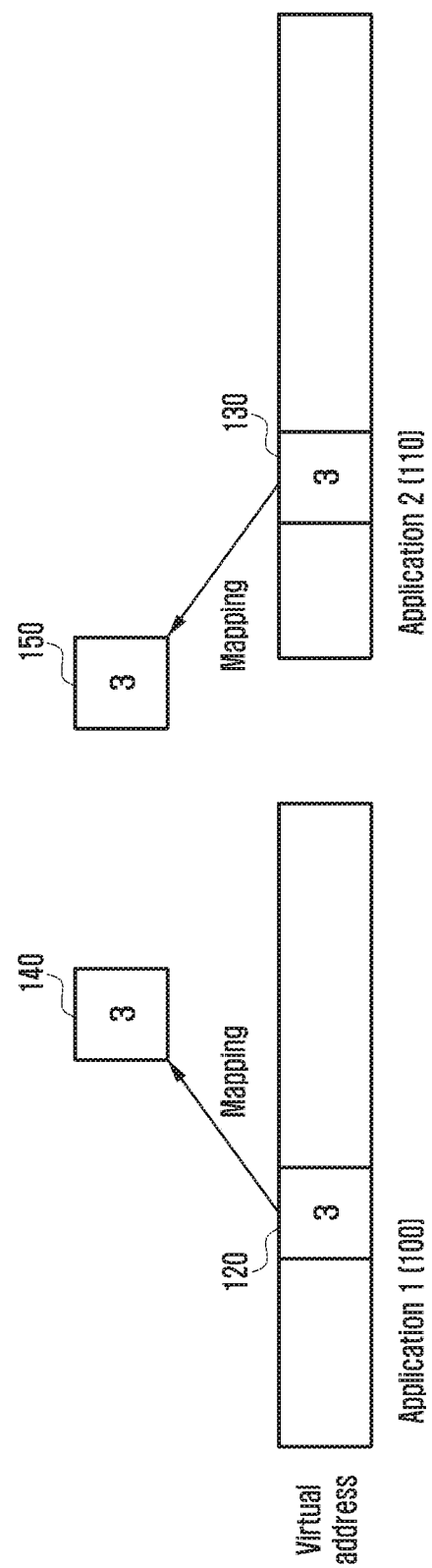
FIG. 1A illustrates a memory management scheme of an electronic device.

FIGS. 1A and 1B illustrate a page merging scheme in detail according to an embodiment of the present invention.

FIG. 1A illustrates a memory management scheme of an electronic device. The electronic device may install a first application 100 and a second application 110. At least one application installed in the electronic device may perform a specific function using a virtual address space.

For example, assume that data 120 of "11" is written in a virtual address space corresponding to the first application 100 by execution of the first application 100 or execution of a specific function associated with the first application 100, and data 130 of "11" is written in a virtual address space corresponding to the second application 110 by execution of the second application 110 or execution of a specific function associated with the second application 110.

As shown in FIG. 1A, the electronic device may map the data "11" (120) associated with the first application 100 and the data of "11" (130) associated with the second application 110 to different physical pages 140 and 150, respectively.

In this case, when the data of "11" is included multiple times in the virtual address space corresponding to the first application 100, the multiple instances of data "11" are mapped to different physical pages.

In this scheme, as the electronic device may map instances of the same content data contained in the virtual address space associated with an application to different physical pages, the memory efficiency is reduced.

FIG. 1B illustrates a page merging scheme of an electronic device according to an embodiment of the present invention. To increase the memory efficiency, unlike that shown in FIG. 1A, the electronic device may map the data "11" (120) associated with the first application 100 and the data of "11" (130) associated with the second application 110 to the same physical page 160. This can be referred to as page merging.

For example, the electronic device may initialize pages in the virtual address space associated with an application. If the initialization value is a preset specific value, the electronic device can determine a page initialized to the specific value as a target to be merged. Then, the electronic device can merge the pages determined as a target to be merged by mapping them to the same physical page.

Figure 2:
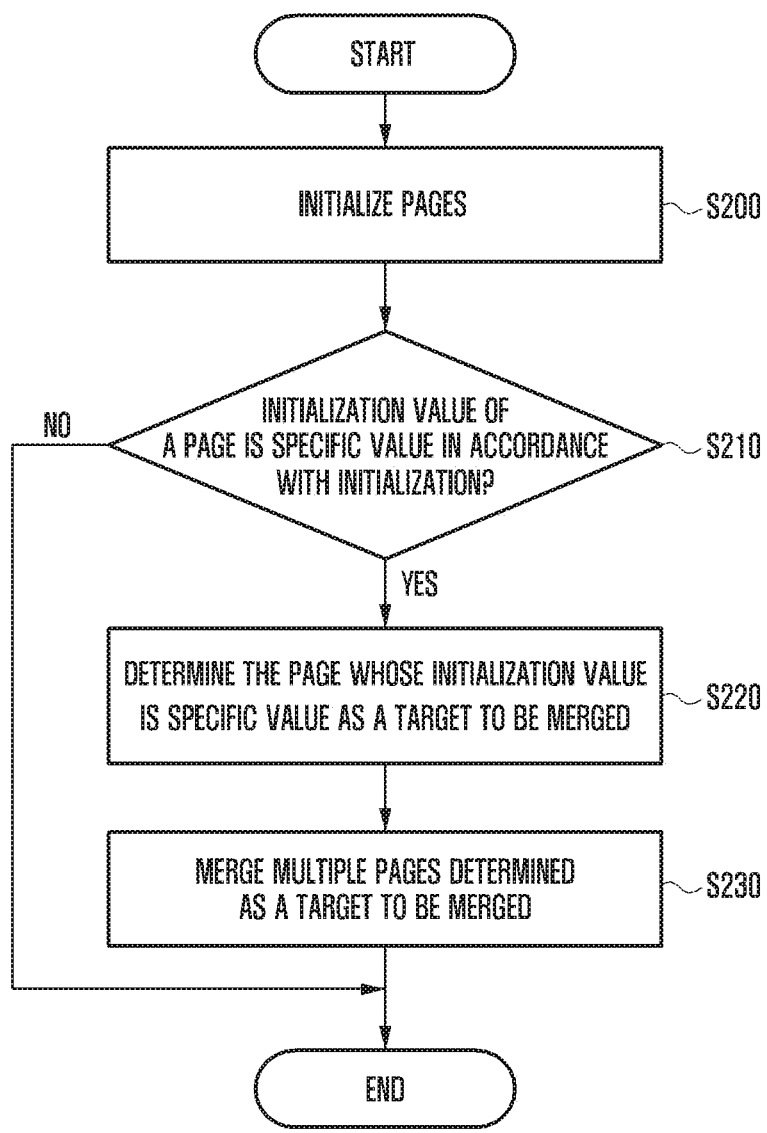
FIG. 2 is a flowchart illustrating a page merging scheme of an electronic device according to an embodiment of the present invention.

Next, a detailed description is given of a page merging scheme for the electronic device according to an embodiment of the present invention with reference to FIG. 2.

First, at step S200, the electronic device initializes data of a page. A page is a contiguous interval with a fixed length in a virtual address space and may be a basic unit constituting the virtual address space. Generally, a page may have a length of 4 KB.

Upon initialization, the electronic device may initialize data of a length set by the initialization function. For example, the electronic device may initialize data recorded in a page with a length of 4 KB.

If all of the data in a page is initialized to the same value, it can be viewed that the page is initialized.

In one embodiment, the electronic device may initialize data in a page using a particular function such as the memset function. However, the use of the memset function is merely an example, and the electronic device may initialize memory data using various functions capable of performing initialization. The electronic device may also include a separate hardware component for data initialization.

At step S210, the electronic device determines whether the initialization value of a page is a preset specific value in accordance with the initialization. The specific value is a value preset in the electronic device and is a value for determining whether the page initialized by the above-described scheme is a target to be merged. For example, the electronic device may designate a constant such as 0 or 1 as the specific value in advance.

There is no need to specify only one specific value. Thus, the electronic device may set a plurality of values as specific values and determine whether the initialization value of a page corresponds to one of the set specific values.

If the initialization value of the page is the specific value in accordance with the initialization, the procedure proceeds to step S220 at which the electronic device determines the page whose initialization value is the specific value as a target to be merged.

Page merging may indicate that the electronic device maps virtual address spaces in which the same contents are recorded to one physical page. Specifically, an application may be installed in the electronic device, and the installed application can perform a specific function using a virtual address space. The electronic device may map the data written in the virtual address space associated with the application to a physical page. Hence, the electronic device may map pieces of the same content data recorded in virtual address spaces associated with plural applications or recorded in a virtual address space associated with one application to one physical page.

At step S230, the electronic device may merge the pages determined as a target to be merged as described above. If there are multiple specific values, the electronic device can classify the initialized pages according to the specific values and merge the classified pages.

Next, individual components of the electronic device performing the above-described operation are described with reference to FIGS. 3A and 3B.

Figure 3A:
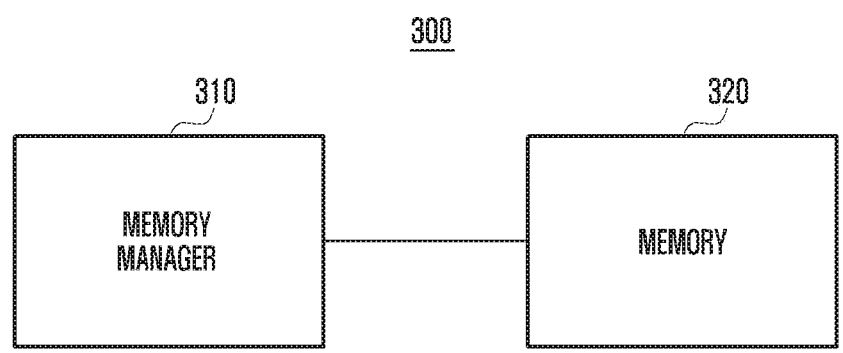
FIGS. 3A and 3B are block diagrams showing the configuration of an electronic device according to an embodiment of the present invention.
Figure 3B:
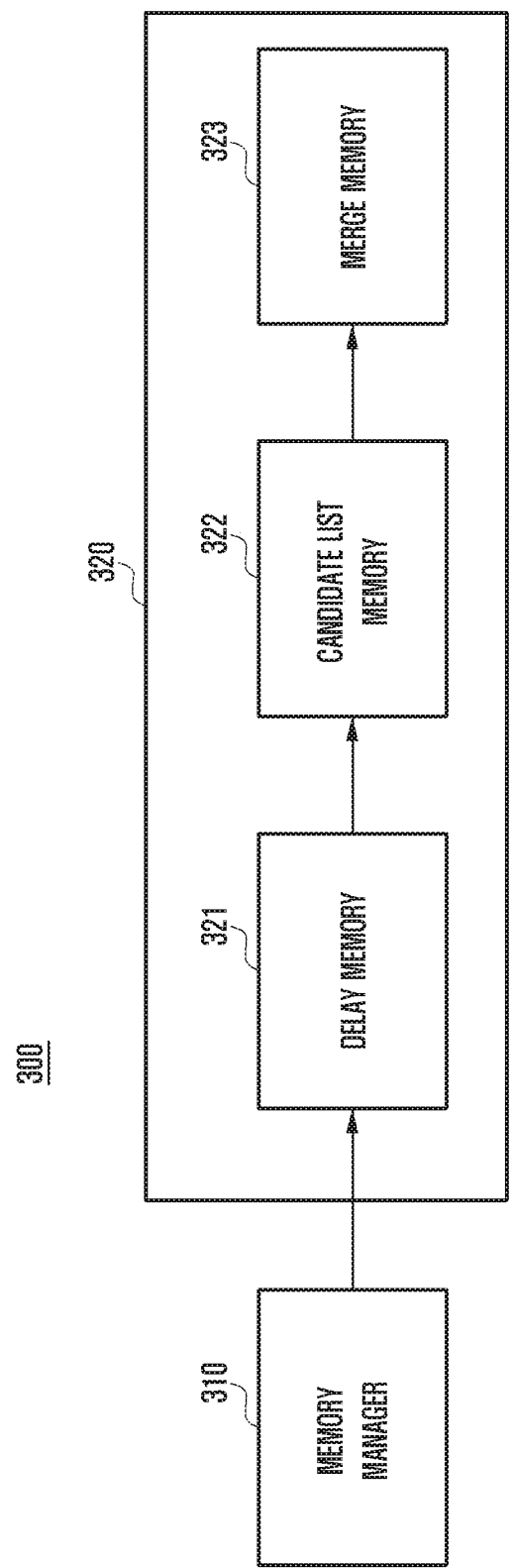

As shown in FIG. 3A, the electronic device 300 may include a memory manager 310 and a memory 320. The memory manager 310 may manage the memory 320. For example, the memory manager 310 may map the virtual address space associated with an application installed in the electronic device 300 to a physical page of the memory 320. In particular, the memory manager 310 may map pieces of the same content data recorded in virtual address spaces associated with plural applications installed in the electronic device 300 or recorded in a virtual address space associated with one application to one physical page of the memory 320.

A description is given of a method for the memory manager 310 to merge pages to efficiently manage the memory 320. The memory manager 310 may initialize pages in the virtual address space. If the initialization value of a page is a preset specific value, the memory manager 310 may determine the page as a target to be merged. The memory manager 310 can repeat the initialization process for the pages in the virtual address space of the electronic device 300 to determine the pages to be merged. Then, the memory manager 310 can merge multiple pages determined as a target to be merged.

Page merging may indicate that the electronic device 300 maps virtual address spaces in which the same contents are recorded to one physical page. Specifically, an application installed in the electronic device 300 can perform a specific function using a virtual address space. The electronic device may map the data written in the virtual address space associated with the application to a physical page of the memory 320. Hence, the electronic device 300 may map pieces of the same content data recorded in virtual address spaces associated with plural applications or recorded in a virtual address space associated with one application to one physical page.

Meanwhile, the memory manager 310 may determine whether a page initialized to the specific value has a size greater than or equal to a threshold size.

When pages in the virtual address space are initialized using a specific function like the memset function, the electronic device 300 may determine that a page is initialized to the specific value if all variables in the page are initialized to the specific value. In addition, when the virtual address spaces are merged on a page basis, the effect of reducing the amount of computation may increase.

Hence, the memory manager 310 can determine whether a virtual address space that has been initialized to the same specific value still has a size greater than or equal to the page size.

If a virtual address space still has a size greater than or equal to the page size after being selected for initialization and being initialized, the memory manager 310 may determine the corresponding pages as a target to be merged, merge the determined pages, and store the merged page in the memory 320.

Meanwhile, when a preset number of pages are determined as a target to be merged, the memory manager 310 may determine whether the initialization values of the preset number of pages are still the specific value. The memory management unit 310 may merge multiple pieces of data according to the determination result and store the merged data. For example, the memory management unit 310 may determine the pages whose initialization value is maintained at the specific value for a preset duration or more as a target to be merged in order of initialization from oldest.

In addition, the memory manager 310 may initialize the pages of a virtual address space, classify the pages according to the initialization value, and determine the pages having the same initialized value as a target to be merged. As described before, there may be multiple specific values. Hence, the memory manager 310 may classify the initialized pages according to the specific values and determine the pages initialized to the same specific value as a target to be merged.

For example, the memory manager 310 may classify the initialized pages according to the specific values of 0 and 1, and may determine the pages initialized to the specific value of 0 as a target to be merged and determine the pages initialized to the specific value of 1 as another target to be merged.

In addition, when a given condition is satisfied, the memory manager 310 may merge the pages determined as a target to be merged and store the merged page in the memory 320. For example, the given condition may be satisfied when the utilization of the central processing unit of the electronic device 300 is less than or equal to a corresponding threshold, when the battery level of the electronic device 300 is greater than or equal to a corresponding threshold, or when the amount of idle resources of the electronic device 300 is greater than or equal to a corresponding threshold.

In one embodiment of the present invention, the memory 320 of the electronic device 300 may be divided into multiple sections according to the role. As shown in FIG. 3B, the memory 320 of the electronic device 300 may include a delay memory 321, a candidate list memory 322, and a merge memory 323.

The delay memory 321, the candidate list memory 322, and the merge memory 323 may be implemented using different types of memory. The delay memory 321, the candidate list memory 322, and the merge memory 323 may also be implemented using different areas of the same memory.

The delay memory 321 is used to delay determining whether to merge a page initialized to a specific value.

When a page is initialized and then immediately merged in the electronic device 300, the merge operation may be meaningless and may cause unnecessary overhead. For example, when data recorded in the virtual address space of an application is changed immediately after the data is initialized and merged, the electronic device 300 may have to generate a page fault to reallocate the corresponding page.

A page fault may occur when an application of the electronic device 300 attempts to access data or code that is present in the virtual address space associated with the application but is not present in the memory 320 of the electronic device 300. At this time, the electronic device 300 may allocate a new page to keep the application running as if a page fault has not occurred. Hence, data merging may introduce unnecessary overhead for the electronic device 100 to allocate a new page.

To solve the above problem, the delay memory 321 is used to store a page initialized to a specific value.

Figure 4:
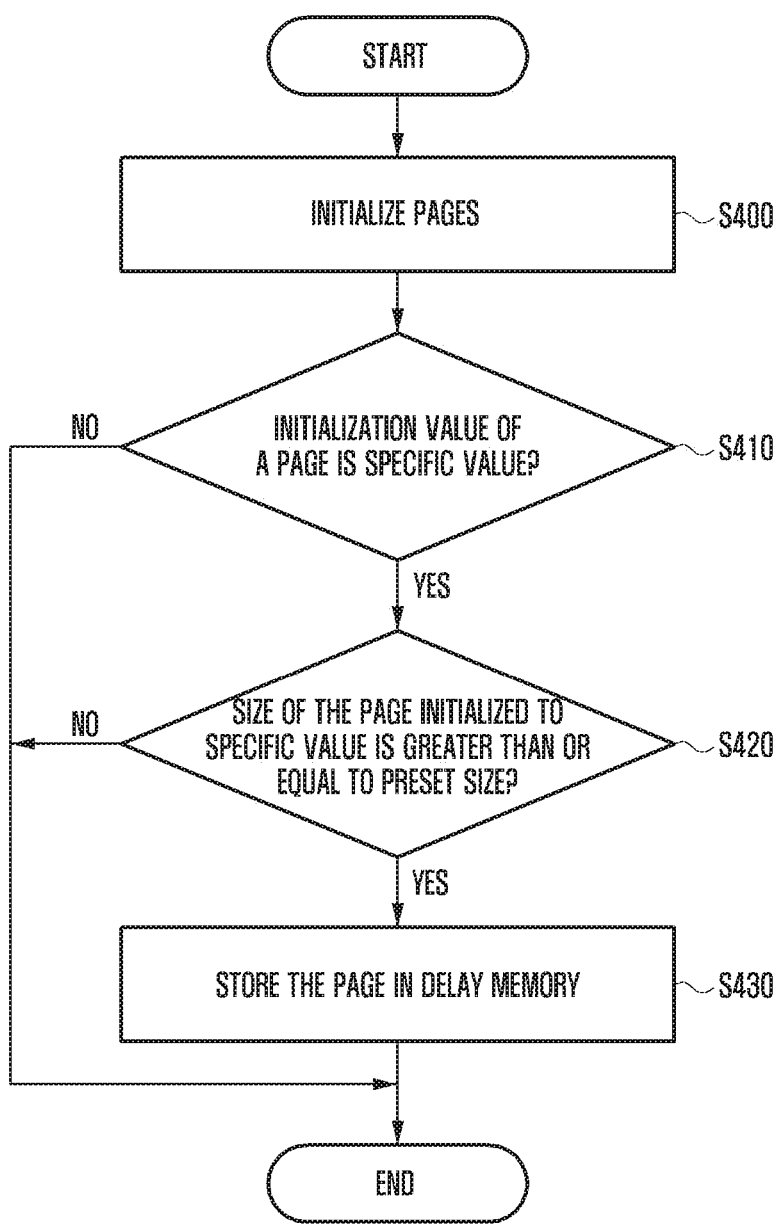
FIG. 4 is a flowchart illustrating a scheme for storing a page in a delay memory according to an embodiment of the present invention.

A description is given of a scheme for the memory manager 310 to store data in the delay memory 321 with reference to FIG. 4.

First, at step S400, the memory manager 310 initializes a page. A page is a contiguous interval with a fixed length in a virtual address space and may be a basic unit constituting the virtual address space. Generally, a page may have a length of 4 KB.

In one embodiment, the memory manager 310 may initialize data in a page using a particular function such as the memset function. However, the use of the memset function is merely an example, and the memory manager 310 may initialize memory data using various functions capable of performing initialization.

At step S410, the memory manager 310 determines whether the initialization value of a page is a preset specific value. If the initialization value of the page is the specific value, the procedure proceeds to step S420 at which the memory manager 310 determines whether the page initialized to the specific value has a size greater than or equal to a preset size.

When pages in a virtual address space are initialized using a specific function like the memset function, the memory manager 310 may determine that a page is initialized to the specific value if all variables in the page are initialized to the specific value.

Hence, the memory manager 310 may determine whether the size of the page initialized to the specific value is at least equal to the size of a page (page size).

If the size of the page initialized to the specific value is greater than or equal to the preset size (e.g. the page size), the procedure proceeds to step S430 at which the memory manager 310 stores the page in the delay memory 321.

Meanwhile, the candidate list memory 322 may store a page whose initialization value is maintained at the specific value among the pages stored in the delay memory 321. A page stored in the delay memory 321 may be moved to the candidate list memory 322 under the control of the memory manager 310.

Figure 5:
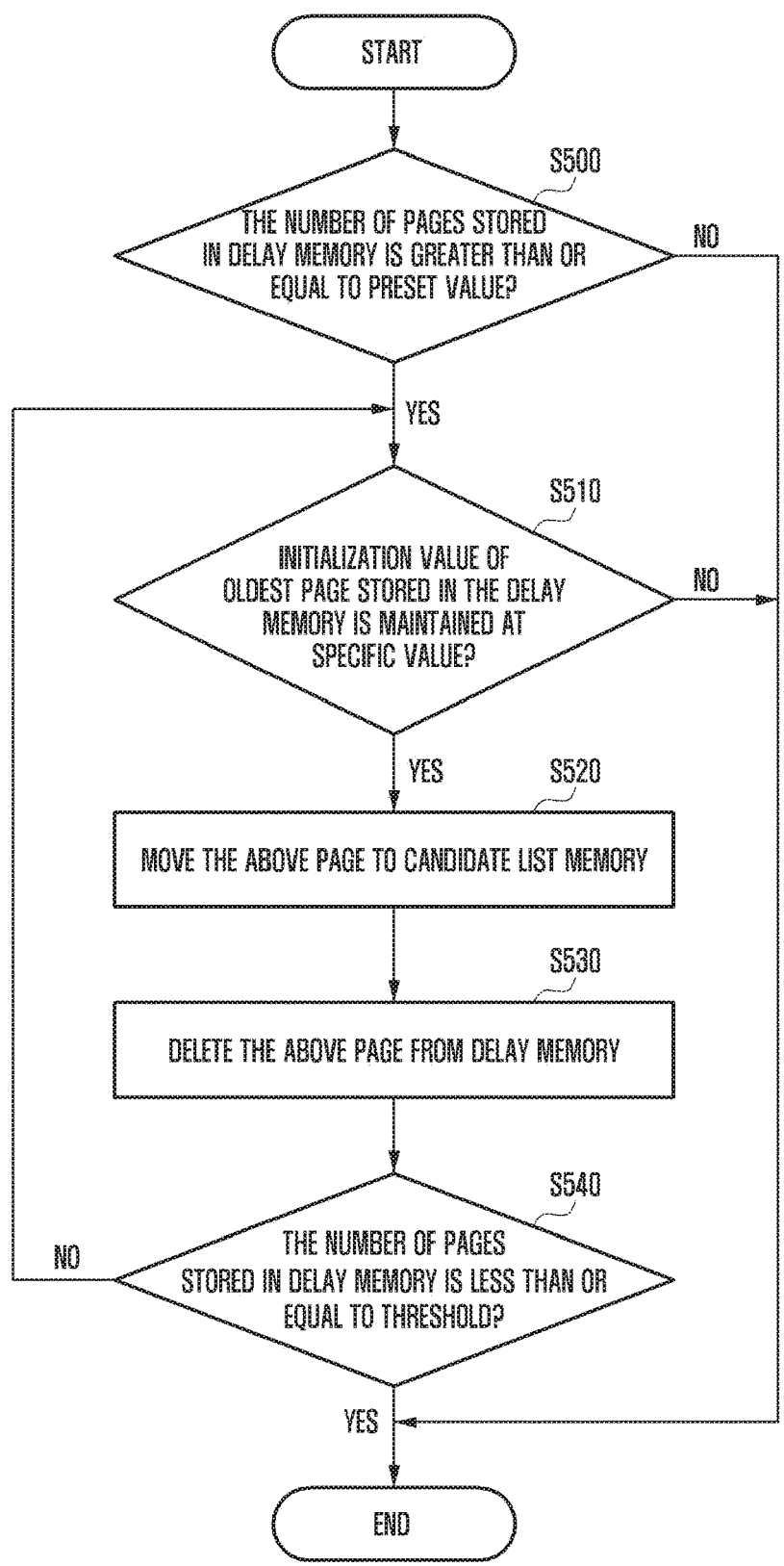
FIG. 5 is a flowchart illustrating a scheme for moving a page stored in the delay memory to a candidate list memory according to an embodiment of the present invention.

Next, a detailed description is given of a scheme for the electronic device 300 to move pages stored in the delay memory 321 to the candidate list memory 322 with reference to FIG. 5.

At step S500, the memory manager 310 of the electronic device 300 determines whether the number of pages stored in the delay memory 321 is greater than or equal to a preset value. If the number of pages stored in the delay memory 321 is greater than or equal to the preset value, the procedure proceeds to step S510 at which the memory manager 310 determines whether the initialization value of the oldest page stored in the delay memory 321 is maintained at the specific value. The memory manager 310 may determine whether the initialization value of a preset number of pages among the pages stored in the delay memory 321 is maintained at the specific value.

For example, when the number of pages stored in the delay memory 321 is greater than or equal to the preset value ($N_{th}$), the memory manager 310 may select $N_p$ pages (a preset number of pages) from among the pages stored in the delay memory 321 in order of storage from oldest and determine whether the initialization value of each of the $N_p$ pages is maintained at the specific value.

If the initialization value of the oldest page is maintained at the specific value, the procedure proceeds to step S520 at which the memory manager 310 moves the oldest page whose initialization value is maintained at the specific value to the candidate list memory 322. Thereafter, at step S530, the memory manager 310 deletes the page having been moved to the candidate list memory 322 from the delay memory 321. In this case, the delay memory 321 may be operated as a queue where first stored data is deleted first.

At step S540, the memory manager 310 determines whether the number of pages stored in the delay memory 321 is less than or equal to a threshold value. For example, the memory manager 310 may determine whether the number of pages stored in the delay memory 321 is less than or equal to the value given by $N_{th}-N_p$.

Namely, upon determining that the initialization value of the oldest page stored in the delay memory 321 is maintained at the specific value, the memory manager 310 moves the oldest page to the candidate list memory 322 and deletes it from the delay memory 321. Then, the memory manager 310 determines whether the number of pages stored in the delay memory 321 is less than or equal to $N_{th}-N_p$. Upon determining that the number of pages stored in the delay memory 321 is greater than $N_{th}-N_p$, the memory manager 310 may determine whether the initialization value of the next oldest page stored in the delay memory 321 is maintained at the specific value.

As a result, the memory manager 310 may repeat the above steps S510 to S530 until the number of pages stored in the delay memory 321 becomes less than or equal to the threshold value.

Meanwhile, the pages stored in the candidate list memory 322 may be merged and stored in the merge memory 323. For example, the pages initialized to the same specific value may be mapped to one physical page of the merge memory 323.

Specifically, when the number of pages stored in the delay memory 321 becomes less than or equal to a preset value (e.g. $N_{th}-N_p$) by the above-described scheme, the memory manager 310 may merge the pages stored in the candidate list memory 322 and store the merged page in the merge memory 323.

With the above-described scheme, the electronic device 300 does not have to periodically scan a preset memory area to merge pages.

Specifically, unlike the existing memory deduplication technique such as kernel same-page merging (KSM), the electronic device 300 of the present invention does not perform determining whether each page is a target to be merged. Therefore, electronic devices such as mobile devices and TVs can efficiently manage the memory without a burden of increasing the amount of computation.

Meanwhile, the components of the above-described electronic device can be implemented in software. For example, the memory manager of the electronic device may further include a flash memory or other nonvolatile memory. Such a nonvolatile memory may store programs for performing functions of the memory manager.

In addition, the memory manager of the electronic device may be configured to include a CPU and a random access memory. The CPU of the memory manager may copy the programs stored in the nonvolatile memory into the RAM and execute the copied programs to thereby perform the functions of the electronic device described above.

The memory manager is configured to control the electronic device. "Memory manager" may be used interchangeably with "central processing unit", "microprocessor", "control unit", "processor", "operating system", and the like. In addition, the memory manager of the electronic device and other functional units such as a communication module included in the electronic device may be implemented as a single-chip system (system-on-a-chip, system on chip, SOC, or SoC).

Meanwhile, in various embodiments, the page merging method of the electronic device described above may be coded in software and stored in non-transitory readable media. Such non-transitory readable media can be installed and used in a variety of devices.

A non-transitory readable medium is not a medium for storing data for a short time such as a register, cache or memory, but refers to a medium that semi-permanently stores data and can be read by a device. Specifically, the non-transitory readable medium may include a CD, DVD, hard disk, Blu-ray disc, USB, memory card, or ROM.

Hereinabove, exemplary embodiments of the present invention have been described with reference to the accompanying drawings. Specific terms or words used herein should be construed in accordance with the spirit of the present invention. It should be understood that many variations and modifications of the basic inventive concept described herein will still fall within the spirit and scope of the present invention as defined in the appended claims and their equivalents.

The invention claimed is:

1. An electronic device comprising:
a memory; and
a memory manager configured to:
  initialize data within a specific range of pages by initializing data of each of the pages included in the specific range, the data of each page included in the specific range having a length set by an initialization function, all data of each of the pages included in the specific range being initialized to a same value,
  determine, in case that at least one page included in the specific range is initialized to a specific value, that the at least one page included in the specific range is initialized,
  determine one or more pages included in the specific range to be merged, in case that an initialized value of the one or more pages included in the specific range among the initialized at least one page included in the specific range is the specific value,
  merge the one or more pages included in the specific range determined to be merged, and
  manage the memory to store the merged one or more pages included in the specific range,
wherein the memory comprises a delay memory configured to store the one or more pages included in the specific range that are determined to be merged, and wherein the memory manager is further configured to:
  select a preset number of pages from the delay memory, in case that a number of pages stored in the delay memory is greater than or equal to a preset value,
  determine whether the initialized value of each of the selected preset number of pages from the delay memory is maintained at the specific value,
  merge the selected preset number of pages from the delay memory, the initialized value of the selected preset number of pages from the delay memory being maintained at the specific value, and
  store the merged selected preset number of pages from the delay memory in the memory.

2. The electronic device of claim 1, wherein the memory manager is further configured to:
  determine whether a size of the specific range initialized to the specific value is greater than or equal to a preset size, and
  in case that the size of the specific range is greater than or equal to the preset size, identify that the at least one page included in the specific range is initialized.

3. The electronic device of claim 1, wherein, in case that a preset number of pages is determined as targets to be merged, the memory manager is further configured to:
  determine whether an initialization value of the preset number of pages is maintained at the specific value,
  merge multiple pieces of data, and
  store the merged data according to a result of the determining.

4. The electronic device of claim 1, wherein the memory manager is further configured to:
  initialize pages,
  classify the initialized pages, and
  determine pages having a same initialization value as targets to be merged.

5. The electronic device of claim 1, wherein the memory manager is further configured to merge multiple pieces of data determined as targets to be merged based on a utilization of a central processing unit of the electronic device being less than or equal to a utilization threshold, in case that a battery level of the electronic device is greater than or equal to a battery threshold, or in case that an amount of idle resources of the electronic device is greater than or equal to an idle resources threshold.

6. The electronic device of claim 1, wherein the memory comprises:
  a candidate list memory configured to store the one or more pages whose initialization value is maintained at the specific value among pages stored in the delay memory; and
  a merge memory configured to:
    merge pages stored in the candidate list memory, and
    store the merged pages.

7. The electronic device of claim 6, wherein the memory manager is further configured to:
  in case that a number of pages stored in the delay memory is greater than or equal to a preset value, select a preset number of pages from among the pages stored in the delay memory in an order of storage from oldest to newest, determine whether an initialization value of each of the selected preset number of pages is maintained at the specific value, and move pages whose initialization value is maintained at the specific value to the candidate list memory, and in case that the number of pages stored in the delay memory is less than the preset value, move the pages stored in the candidate list memory to the merge memory.

8. A method of merging pages by an electronic device, the method comprising:
  initializing data within a specific range of pages by initializing data of each of the pages included in the specific range, the data of each page included in the specific range having a length set by an initialization function, all data of each of the pages included in the specific range being initialized to a same value;
  determining, in case that at least one page included in the specific range is initialized to a specific value, that the at least one page included in the specific range is initialized; determining one or more pages included in the specific range to be merged, in case that an initialized value of the one or more pages included in the specific range among the initialized at least one page included in the specific range is the specific value; and
  merging the one or more pages included in the specific range determined to be merged,
  wherein the merging further comprises:
    selecting a preset number of pages from a delay memory, in case that a number of pages stored in the delay memory is greater than or equal to a preset value,
    determining whether the initialized value of each of the selected preset number of pages from the delay memory is maintained at the specific value, and
    merging the selected preset number of pages from the delay memory, the initialized value of the selected preset number of pages from the delay memory being maintained at the specific value.

9. The method of claim 8, wherein the determining of the one or more pages to be merged comprises:
  determining whether a size of the specific range initialized to the specific value is greater than or equal to a preset size; and
  in case that the size of the specific range is greater than or equal to the preset size, identifying that the at least one page included in the specific range is initialized.

10. The method of claim 8, wherein the merging of the one or more pages comprises:
  in case that a preset number of pages is determined as targets to be merged, determining whether an initialization value of the preset number of pages is maintained at the specific value; and
  merging multiple pieces of data according to a result of the determining.

11. The method of claim 8, wherein the determining of the at least one page to be merged comprises:
  initializing the pages;
  classifying the initialized pages; and
  determining pages having a same initialization value as targets to be merged.

12. The method of claim 8, wherein the merging of the one or more pages comprises merging the one or more pages determined to be merged in case that a utilization of a central processing unit of the electronic device is less than or equal to a utilization threshold, in case that a battery level of the electronic device is greater than or equal to a battery threshold, or in case that an amount of idle resources of the electronic device is greater than or equal to an idle resources threshold.

13. The method of claim 8, wherein the merging of the one or more pages comprises:
  storing the one or more pages determined to be merged in the delay memory;
  storing the one or more pages whose initialization value is maintained at the specific value, among pages stored in the delay memory, in a candidate list memory;
  merging pages stored in the candidate list memory; and
  storing the merged pages in a merge memory.

14. The method of claim 13, wherein the merging of the at least one page further comprises:
  in case that a number of pages stored in the delay memory is greater than or equal to a preset value, selecting a preset number of pages from among the pages stored in the delay memory in an order of storage from oldest to newest, determining whether an initialization value of each of the selected preset number of pages is maintained at the specific value, and moving pages whose initialization value is maintained at the specific value to the candidate list memory; and
  in case that the number of pages stored in the delay memory is less than the preset value, moving the pages stored in the candidate list memory to the merge memory.

15. The electronic device of claim 1, wherein the memory manager is further configured to:
  initialize the pages using a specific function, and
  in response to initializing the pages using the specific function, determine that a page is initialized to the specific value based on all variables in the page being initialized to the specific value.

* * * * *